(12) United States Patent
Facon et al.

(10) Patent No.: US 11,481,522 B2
(45) Date of Patent: Oct. 25, 2022

(54) CIRCUIT CONFIGURED TO MONITOR A SENSITIVE PAYLOAD FOR ATTACK DETECTION

(71) Applicant: SECURE-IC SAS, Cesson-Sevigne (FR)

(72) Inventors: Adrien Facon, Paris (FR); Robert Nguyen, Boulogne Billancourt (FR)

(73) Assignee: SECURE-IC SAS, Cesson-Sevigne (FR)

( * ) Notice: Subject to any disclaimer, the term of this patent is extended or adjusted under 35 U.S.C. 154(b) by 57 days.

(21) Appl. No.: 17/276,465

(22) PCT Filed: Sep. 13, 2019

(86) PCT No.: PCT/EP2019/074576
§ 371 (c)(1),
(2) Date: Mar. 15, 2021

(87) PCT Pub. No.: WO2020/058139
PCT Pub. Date: Mar. 26, 2020

(65) Prior Publication Data
US 2022/0035955 A1    Feb. 3, 2022

(30) Foreign Application Priority Data

Sep. 17, 2018 (EP) ...................................... 8306204

(51) Int. Cl.
*G06F 21/75* (2013.01)
*G06F 21/55* (2013.01)
*G06F 21/76* (2013.01)

(52) U.S. Cl.
CPC ............ *G06F 21/75* (2013.01); *G06F 21/554* (2013.01); *G06F 21/556* (2013.01); *G06F 21/76* (2013.01)

(58) Field of Classification Search
CPC ...... G06F 21/75; G06F 21/556; G06F 21/554; G06F 21/76
See application file for complete search history.

(56) References Cited

U.S. PATENT DOCUMENTS 7,219,319 B2 * 5/2007 Gould ..................... H04L 63/12
326/46
8,972,697 B2 * 3/2015 Sperber ............... G06F 9/30043
711/220

(Continued)

FOREIGN PATENT DOCUMENTS

EP    2 031 537 A1    3/2009
EP    3 086 255 A1    10/2016

(Continued)

*Primary Examiner* — Viral S Lakhia
(74) *Attorney, Agent, or Firm* — BakerHostetler (57) ABSTRACT

A circuit for monitoring a circuit payload, includes a plurality of sensors distributed in the circuit, next to the predefined circuit payload; one or more memory units associated with the one or more sensors configured to store sensors' measures made by the one or more associated sensors, every p clock cycles; wherein the circuit is configured to read the sensors' measures stored in at least some of the memory units. Embodiments comprise the use of digital sensors, or analogical sensors coupled with digital converters; the use of FIFO type memory units, adjustments of the depths of the memory units; the use of Finite State Machines configured to cause the circuit to receive sensors' measures; the use of data obfuscation and/or reduction modules; the use of a signature circuit, the use of circuits configured to determine one or more attacks from the sensors' measures.

13 Claims, 3 Drawing Sheets

(56) References Cited

U.S. PATENT DOCUMENTS

| | | | | |
|---|---|---|---|---|
| 10,083,303 B2* | 9/2018 | Vedula | ............... | G06F 21/56 |
| 10,445,168 B2* | 10/2019 | Mayer | ............... | G06F 11/079 |
| 10,511,451 B2* | 12/2019 | Lu | ............... | G09C 1/00 |
| 10,795,678 B2* | 10/2020 | Fowers | ............... | G06F 9/3001 |
| 11,307,230 B2* | 4/2022 | Guerard | ............... | G01R 19/04 |
| 2019/0100314 A1* | 4/2019 | Prager | ............... | B64C 39/024 |
| 2022/0148082 A1* | 5/2022 | Lacey | ............... | G06Q 20/40 |

FOREIGN PATENT DOCUMENTS

| | | |
|---|---|---|
| EP | 3 279 823 A1 | 2/2018 |
| EP | 3 340 214 A1 | 6/2018 |

\* cited by examiner

CIRCUIT CONFIGURED TO MONITOR A SENSITIVE PAYLOAD FOR ATTACK DETECTION

CROSS-REFERENCE TO RELATED APPLICATIONS

This application is a National Stage of International patent application PCT/EP2019/074576, filed on Sep. 13, 2019, which claims priority to foreign European patent application No. EP 18306204.1, filed on Sep. 17, 2018, the disclosures of which are incorporated by reference in their entirety.

TECHNICAL FIELD

The invention generally relates to computer security and in particular to methods and systems for monitoring a circuit.

BACKGROUND

For years, computer security has represented a major challenge of modern computerized systems, devices or digital circuits. Such systems or devices are continuously threatened by more and more sophisticated attacks. This has resulted in an ever increasing complexity of computer security. In parallel, applications of computer science continue to widen, e.g. in the field of the Internet of Things, such applications involving new interactions between devices and introducing vulnerabilities.

Integrated circuits (such as a smartcard, a microprocessor, an ASIC (acronym for Application-Specific Integrated Circuit) or a FPGA (acronym for Field Programmable Gate Array) are particularly sensitive to attacks. A circuit can comprise one or more sensitive parts (blocks, IPs, etc.) referred to as "payload" that need to be protected or comprise sensitive data. A circuit payload may implement one or more cryptographic mechanisms to ensure security, authentication, protection and/or privacy of data. Attackers willing to access sensitive assets from a circuit payload may use various types of attacks, which when successful can result in the disclosure of sensitive assets such as cryptographic keys, in the failure of one or more sensitive functions, or in the failure of an access control policy which could result in granting access without correct credentials.

There exist various solutions to protect a circuit. However such solutions are either specific to a given type of attack performed on a circuit, considered as a whole, or can only enable detection of an attack a posteriori, that is after the attack has been performed. In particular, they do not enable to monitor a sensitive circuit payload sufficiently in advance to prevent an attack.

There is accordingly a need for improved methods and systems to monitor a sensitive circuit payload.

SUMMARY

There is provided a circuit for monitoring a circuit payload, comprising:
  a plurality of sensors distributed in said circuit, next to the predefined circuit payload, the sensors being configured to provide measures related to the environment of the circuit; one or more memory units associated with the one or more sensors configured to store sensors' measures made by the one or more associated sensors, every p clock cycles; wherein the circuit is configured to read the sensors' measures stored in at least some of the memory units.

Embodiments comprise:
  the use of digital sensors, or analogical sensors coupled with digital converters; and/or
  the use of FIFO type memory units, adjustments of the depths of the memory units; and/or
  the use of Finite State Machines configured to cause the circuit to read sensors' measures every p clock cycles, or during q cycles of p cycles; and/or
  the use of data obfuscation and/or reduction modules; and/or
  the use of a signature circuit; and/or
  the use of circuits configured to determine one or more attacks from the sensors' measures.

Embodiments of the invention present various advantages, in various technical fields, such advantages including with no limitation: privacy, intelligence, finance (transactions, trading, etc), governmental applications (e.g. passport, ID-card, driver license, etc), military applications (e.g. drones, remote sensors, etc), transportation and logistics, protection of critical networks in energy, utilities, oil & gas, traffic regulation (e.g. aircrafts, trains, cars, etc), medical applications, communications (e.g. Internet of Things, Machine to Machine, data or voice communications, security (e.g. building or area access).

Embodiments of the invention may be advantageously used in a wide range of communication and data processing applications such as in the car industry applications to ensure anti-theft protection, in service provider systems to secure access cards, in RFID tags and electronic keys, in mobile phone devices to authenticate the control and access to batteries and accessories, in manufacturing of embedded devices and equipments to provide a protection of hardware and software algorithms against cloning, in banking industry to secure banking accounts and financial transactions, etc.

BRIEF DESCRIPTION OF DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

To facilitate the understanding of the following description of some embodiments, there follows definitions of some terms as used herein.

A "sensor" (or "sensing unit") can be an analogical sensor coupled with a digital converter and/or a "digital sensor". In some embodiments, only analogical sensors may be used (along Analog-to-Digital converters). In alternative embodiments, only digital sensors may be used. In still other embodiments, both analogical and digital sensors may be used.

In some embodiments, at least one "sensor" can also be a "logical sensor". Such a logic/logical sensor may wait for the security supervisor module (software and/or hardware) which is inside or outside the Operating System (OS) to emit some security events (for instance, those logged in "/var/log/dmesg" under GNU/Linux OS.

In an embodiment, a "sensor" can comprise an analog sensor coupled with an analog/digital converter. Sensors available on the market thus can be used. For example, an illumination laser sensor can be used. In another example, a magnetic sensor can be used.

In an embodiment, a sensor may be a "passive" sensor. The passive property of the sensor indicates that a measurement is taken from the environment, but there is no interaction with this environment to setup specific condition before measurement. To the opposite, other types of sensors may need an active interaction with the environment. Examples for such active sensors are to switch off then on the power in case of a RAM-PUF, or to switch off the light in case of a camera sensor, or to move from one to another physical position in case of a linear-accelerator sensor. Passive property enables sensor measurements at any time without any external constraint.

In an embodiment, a sensor may not even require a request to communicate its measures. In an embodiment, a sensor "continuously" outputs its measures. In an embodiment, a sensor "intermittently' outputs one or more measures of the environment.

A sensor can be molded in, integrated with, coupled to, attached to, associated with, glued to, releasable or not, to the target circuit under surveillance or monitoring.

In an embodiment, a "sensing unit" may comprise a set of "digital sensors", the set of "digital sensors" comprising at least two sensors, the sensors being arranged in parallel, each "digital sensor" providing a digitized bit output having a binary value, the "sensing unit" being configured to deliver at least one binary vector comprising a multi-bit value, the multi-bit value comprising at least two bit outputs provided by the set of digital sensors.

In an embodiment, a "digital sensor" may comprise one or more memory elements interconnected by combinatorial cells. Memory elements are configured to store input, intermediate and/or output values. The combinatorial standard cells are configured to compute the value to be stored in the next memory elements, taking as input values the signals stored in the previous memory elements. Combinatorial standard cells may include memory less logic gates that may implement Boolean functions such as invertors, OR, AND, XOR. Other combinatorial standard cells may include buffers whose function is to amplify and/or delay some data path.

As used herein, a "digital sensor" may comprise a set of n binary digital sensors being arranged in parallel, and provides a multi-bit output (multivariate output) comprising a set of bits.

A "digital sensor" can comprise a digital circuit having an input memory element for storing a reference data, a data path for propagating the reference data and an output memory element for storing the data propagated through the data path. The computation can be deemed successful if the reference data correctly arrives from the input memory element to the output memory element in time for being sampled, that is to say within less than a clock cycle. Such a digital sensor can detect abnormal operating conditions or out-of-specifications operating conditions. For example, if the temperature increases above a given threshold, the propagation delays of the combinatorial gates in the digital sensor data path will increase to the point where the data reaches the output memory element after the clock rising edge. Such late arrival may induce a faulty state in an output memory element with respect to the reference signal. This faulty state can be detected by comparison of the values in the memory elements further used to generate an alarm.

Such digital sensor architecture advantageously addresses violations of setup time. Violation of the setup time is a common source of faulty computations in digital circuits and one of the common techniques exploited by attackers for performing fault injection. Setup time violation may arise because the propagation delay in the data path is too long for the modifications to be propagated and stable early enough before the clock rising edge.

A digital sensor alarm threshold may be determined statically during the design phase. Alternatively, it can be selected dynamically by software and/or hardware at runtime. In some embodiments, a calibration device may calibrate a digital sensor, the digital sensor being configured to protect a payload or target digital circuit fed by a clock signal having a clock period by triggering an alarm depending on a triggering condition related to the clock period and to an optimal alarm threshold, the optimal alarm threshold being determined by minimizing a quantity depending on the probability of occurrence of false positives and on the probability of occurrence of false negatives. In an embodiment, the probability of false negatives may be determined from the probability density of the critical path propagation delay of the target digital circuit and the probability density of the alarm threshold.

A "memory" (or memory unit) can be of different types. A memory unit can be volatile, or can even combine the use of both volatile and non-volatile memory units. A volatile memory can use one or more of a RAM, DRAM (e.g., DDR SDRAM) SRAM, T-RAM, and Z-RAM. Using volatile memory generally presents the advantage of improving read/write performance, with a lower cost/footprint than non-volatile writable memories. In an embodiment, one or more memory units can use 3D XPoint, CBRAM, SONOS, RRAM, Racetrack memory, NRAM, Millipede memory, FJG RAM.

Memory units can be distributed, or can take the form of a (macroscopic) "shared memory".

In one embodiment, a memory unit is of "First-in-First-Out (FIFO)" type. FIFO designates a method for organizing and manipulating a data buffer, where the oldest (first) entry, or 'head' of the queue, is processed first. It is analogous to processing a queue with first-come, first-served FCFS behavior. Physically, Finite-State-Machines (FSM) can emulate a FIFO mechanism. In its hardware form, a FIFO primarily comprises a set of read and write pointers, storage and control logic. Storage may be static random access memory (SRAM), flip-flops, latches or any other suitable form of storage. Dual-port SRAM may be used, wherein one port is dedicated to writing and the other to reading. In some embodiments, a synchronous FIFO may be used (it is a FIFO where the same clock is used for both reading and writing). In some embodiments, an asynchronous FIFO may be used (different clocks for reading and writing). For example asynchronous FIFO may use uses a Gray code (or any unit distance code) for the read and write pointers to ensure reliable flag generation (pointer arithmetic or leaky bucket approach). Examples of FIFO status flags include: full, empty, almost full, almost empty, etc. Yet, in some embodiments, other queuing systems than FIFO can be used. For example, "priority queuing" may be used.

As used herein, a "circuit" or "module" is a hardware circuit or sub-circuit. Any piece of hardware can be coded in software and vice-versa. Advantages of the hardware embodiments include the fact that circuits are less prone to interception and attacks, as they are all "internal". Advantages of the software comprise the fact that they enable a decrease of the silicium surface (encoding in software) and that they can be upgraded after manufacturing.

A "signature" is an ID which can be used as a secret (not stored, but retrievable, replayable).

As used herein, a "payload" (or "target digital circuit") designates a circuit or a part of a circuit (such as for example a circuit block, or a circuit IP), which is "sensitive", or otherwise is to be protected. For example, a payload can comprise a ciphering unit or cipher e.g. AES, a memory, a bus, a given microelectronic component, etc. The granularity of the payload can vary from "atomic" hardware pieces to macro-blocks designed and sold at foundries. A payload in particular can be a "crypto-accelerator", e.g. a whole crypto-component or a computing unit for a dedicated ciphering operation. A payload can be a memory which stores sensitive data, such as ciphering keys, access-ID, certificates, money values, etc. In the context of a safety system, the payload can be an input from a specific sensor or an output to a specific activator that deals with human-safety or industrial expensive goods. A payload can designate any embedded device or system manipulating and/or incorporating secret data and/or requiring a level of integrity, such as a smart card, a secure device, a multimedia player, a recorder, or a mobile storage device like memory cards and hard discs. The circuit payload may implement one or more cryptographic mechanisms to ensure security, authentication, protection and/or privacy of data. More generally, a payload can designate any good that needs to be protected from spying or alteration.

As used herein, the term "Finite-State Machine", acronym FSM, designates a mathematical model of computation used to design both computer programs (i.e. software) and sequential logic circuits (i.e. hardware). Embodiments of the invention can be exclusively in software, or exclusively in hardware or combine both software and hardware embodiments). In a digital circuit, an FSM can be built using a programmable logic device, a programmable logic controller, logic gates and flip flops or relays. Depending on embodiments, a FSM can be a Moore machine or a Mealy machine. In a Moore machine, a FSM uses only entry actions, i.e. output depends only on the state. The advantage of the Moore model is a simplification of the behavior of the FSM. In an embodiment, the FSM can be a Mealy machine. In a Mealy machine, the FSM uses only input actions, i.e. output depends on input and state. The use of a Mealy FSM leads often to a reduction of the number of states. In an embodiment, a FSM can be a UML (acronym for Unified Modeling Language) machine. A finite-state machine FSM can be in one of a finite number of states. A finite-state machine FSM can be in only one state at a time. The state it is, in at any given time, is called the 'current' state. A finite-state machine F.S.M can change from one state to another state ("transition") when initiated by a triggering event or condition. A particular finite-state machine FSM is defined by a list of its states and by the triggering condition for each transition. A state machine can be represented by a state transition table or list or graph, showing for each state the corresponding new state or "output state". It can also be represented by a directed graph called a state diagram. Each of the states can be represented by a node (circle), while edges (arrows) can show the transitions from one state to another state. More generally, in the present description, the expression "finite-state machine" or "finite-state machine FSM" can be replaced by a "controller".

A "memory" can be modified into a FIFO type memory by a FSM. A "memory" also can be named a "register".

The expression "clock cycle" noted $T_{clk}$ or "clock rate" noted $F_{clk}$—refers to the clock of the circuit being monitored, possibly integrated into a larger environment, e.g. 1333 MHz. The "clock cycle" noted $T_{clk}$ is the duration of an elementary or atomic time step. Clock cycle and clock rate are linked by the following relation: $F_{clk}=1/T_{clk}$. The clock rate typically refers to the frequency at which a circuit is running. It is generally measured in clock cycles per second or its equivalent, in hertz (Hz), kilohertz (kHz), megahertz (MHz) or gigahertz (GHz).

Figure 1:
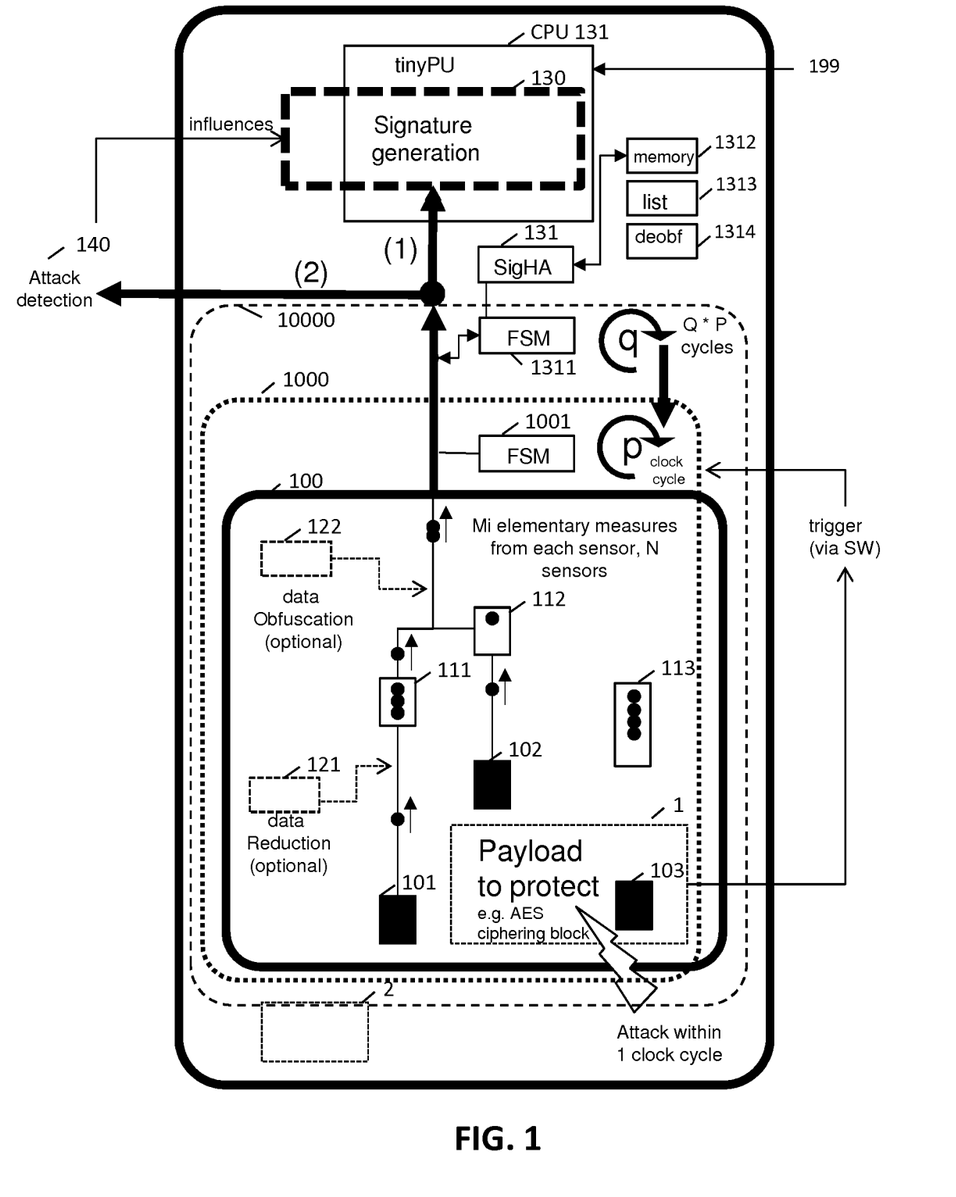
FIG. 1 shows the general architecture of a circuit monitored according to different embodiments of the invention.

Referring to FIG. 1, there is shown a circuit 100 for monitoring a circuit payload, comprising a plurality of sensors 101, 102, 103 distributed in the circuit, next to the predefined circuit payload 1, 2, one or more memory units (111, 112, 113) associated with the one or more sensors configured to store sensors' measures made by said one or more associated sensors, every p clock cycles. The circuit is configured to read the sensors' measures stored in the memory units.

As used herein, the expression "next to" (or "close to") encompasses arrangements wherein a sensor may be located in the circuit payload, on the circuit payload, above the circuit payload, under the circuit payload, within the circuit payload, adjacent to the circuit payload, at proximity of the circuit payload, or at the vicinity of the circuit payload.

In one embodiment, a sensor (101, 102, 103) may be a digital sensor, or is an analogical sensor coupled with a digital converter.

In one embodiment, a memory unit may be of FIFO type.

In some embodiments, one or memory units may be FIFO (First-In, First-Out) memory units. In other embodiments, other "priority queuing" mechanisms may be used (provided that measures stemming from sensors are time stamped).

The depth M of a memory unit may be a function of a predefined computation operation performed in a monitored circuit's payload. In some embodiments, memory depth can be adjusted as a function of the type of sensitive computation operation to be performed. In an embodiment, the depth M of a memory unit may be configurable. Each, or all or some of the depths can be configurable, while others can be predefined. In some embodiments, one or more depths can be configurable (Finite State Machines can be used). Contemporary hardware can mix invariant circuits with reprogrammable ones (ASIC/FPGA). It is therefore also possible to configure the different memory unit part of the monitoring circuit according to the invention.

In some embodiments, the respective depths of memory units may be predefined (for example, by know-how, an operator can place specific values of depths of memory units near a payload known to be of a particular type); in other words, once designed, the depths of memory units may generally be set. Yet in some other embodiments, one or more depths can be configurable (and configured de facto, e.g. via RAM settings, round-robin depths, etc.).

In some embodiments, all memory units may have the same depth M. In some embodiments, each memory unit may be adjusted in depth/size, for example as a function of the duration of execution of a given payload. Size adjustments may allow minimal or optimal quantity of memory to reduce gate cost on ASIC or memory bloc allocation on FPGA. In some embodiments, memory units may have different predefined depths (i.e. M1, M2, . . . Mn; e.g. 15 memory units at depth 1, 3 memory units at depth 10 and one memory unit at depth 99).

In one embodiment, the circuit may further comprise a Finite State Machine or FSM configured to cause the circuit 100 to read sensors' measures every p clock cycles.

In one embodiment, a sensor may write in its associated memory unit and another circuit (e.g. the signature block) may read the content of this memory unit. This can be piloted a FSM, designating software and/or hardware embodiments. In an embodiment, the FSM may be a hardware circuit. In another embodiment, the FSM may be soft-coded. In still another embodiment, both software and hardware may be used.

In some embodiments, the circuit may further comprise another Finite State Machine or FSM configured to cause the circuit 130 to read sensors' measures during q cycles of p cycles.

More generally, one or more FSMs can apply a predefined time pattern of sensor's data retrieval. For example, a sequence can be:

[1,0,0,5,0,0,0,0,0,80]:[acquisition during 1 cycle, nothing during 2 cycles, acquisition during 5 cycles, nothing during 5 cycles, acquisition during 80 cycles].

In one embodiment, p and/or q may be configurable.

p and q numbers can be chosen according to different criteria. For example, p and q can be chosen so as to spare energy while enabling full resolution monitoring. For example, because AES ciphering executes 10 clock cycles for AES 128 bits, the reaction of sensors is required to be fast (e.g. p=1, q>=10).

In general, data freshness deprecates rapidly and there is generally no interest in storing at long term the sensors' data. By adjusting N, M, P and Q, the described monitoring system can advantageously cover more or less the payload in space (number of sensors), be reactive or proactive (depending on operations or be planned in advance, etc).

In an embodiment, the arrangement in space of sensors and memory units is configured to optimize the gate number level of the circuit floorplan.

In an embodiment, one or more sensors and/or one or more memory units are interconnected by a single bus or local buses.

All sensors may be interconnected in a topology with a bus (single point of failure). In one embodiment, each (one) sensor may be associated with its own (one) memory unit. In one embodiment, a sensor may be associated with one or more memory units. In another embodiment, one or more sensors may be associated with one memory unit. In one embodiment, one or more sensors may be associated with one memory unit.

In some embodiments, one or more memory units may take the form of a shared memory unit with parallel accesses by the one or more sensors.

In some embodiments, the circuit may further comprise a data obfuscation module configured to obfuscate data stemming from one or more memory units.

In an embodiment, the circuit further comprises a data reduction module configured to filter and/or reduce the amount of data stemming from one or more sensors.

Advantages comprise the reduction of wires if the reduction module is close (in space) to the sensor and/or the reduction of gate number if the reduction module is close (in space) to the memory unit.

In an embodiment, the one more sensors and/or the one or more memory units are reprogrammable. In some embodiments, one more sensors and/or the one or more memory units may be writeable, volatile (or not volatile if write operation can be performed in one clock cycle), reprogrammable (size customizable; like in FPGA).

In one embodiment, the payload natively integrates one or more sensors and/or one or more memory units and/or one or more data reduction modules and/or one or more data obfuscation modules.

In one embodiment, one or more sensors and/or one or more memory units and/or one or more data reduction modules and/or one or more data obfuscation modules can be implemented by way of a FPGA circuit (by contrast an ASIC circuit cannot be reprogrammed). In particular, a digital sensor can be DS can be added in a FPGA component, by upgrading the configuration. This implies that PUF functionalities can be added into a product after its production and even after its sale.

In one embodiment, the arrangement according to the invention can be added to an existing payload or circuit: deposited, glued, attached, associated with, etc.

The attachment can be definitive or temporary, e.g. the arrangement can be releasable or detachable (e.g. flexible electronics).

In one embodiment, the arrangement according to the invention is reconfigurable. Parameters of reconfigurations (e.g. triggering facts or events) comprise the nature of attacks, the sensitive operations to be performed, and continuous optimization of the "coverage" of the (possibly changing) payload by the plurality of sensors and memory units.

In one embodiment, a sensor and/or a memory unit can move itself or be displaced onto the circuit or payload (e.g. using MEMS or other types of actuators), thereby continuously optimizing the coverage or pavement of the payload.

In one embodiment, the circuit may further comprise a signature circuit 130, configured to determine one or more signatures from the sensors' measures.

In one embodiment, the circuit may constitute an "autonomous" Physical Unclonable Function. The described circuit can indeed provide an "autonomous" system which presents characteristics and properties of a PUF. As used herein, the term "autonomous system" refers to a system that does not require an external specific excitation other than what is measured by the set of sensors (the circuit according to the invention is continuously providing data which invariant can be determined in a unique signature). It should be noted that the signature does not have to be revealed, as the circuit can output a stream of values and that the signature circuit 130 can be activated from time to time (to verify the signature of the circuit 100).

The circuit design is compatible with sophisticated challenge-response pair (CPR) embodiments: it can handle punctual and so-defined "challenges". For example, in one embodiment, the circuit may be challenged by an external artificial challenge (for example a challenge submitted via 199 in the CPU 131). Such challenge can be conditionally received and then applied (if satisfying predefined conditions). For example, if a scan is detected (e.g. too many attempts, wrong ranges, etc), then the "PUF-like" circuit can mute or return falsified responses.

In other words, instead of revealing directly its own PUF ID, a challenge-response protocol can be defined on top of the described embodiments of the circuit 100/1000/10000 in order prevent (or inhibit or prevent or forbid) public divulgation of this ID (secret ID). For example, a protocol can comprise the step of identifying a given device (embedding the circuit according to the invention) from a remote server.

In another example, zero-knowledge protocols can be implemented (e.g. a server can be identified by the circuit according to the invention, both server and device detaining the secret). Further, data communication can be allowed or rejected. In one embodiment, the PUF ID can be a vector Vi. A challenge can correspond to a vector Vc of values and a scalar Sc, while the response can correspond to a scalar Rs. Responses may use intermediate value D and Pc to produce Rs. D can be a distance between D=d(Vc minus Vi), wherein d is a distance between vectors. In such an embodiment, Pc=f(D)−Sc, where f is a function which transforms a vector into a scalar and Rs=g(D, Pc), where g is a non-linear function which transform a vector into a scalar (g can be a parametric function modified by scalar Pc). For mutual authentication, two successive challenges may be linked by the Pc value. For example, the server can send two challenges that have the same Pc, thereby proving that it knows the whole vector Vi. Many other schemes or protocol can be designed.

As shown in FIG. 1, the circuit may further comprises a circuit 140 configured to determine one or more attacks from the sensors' measures.

Schemes of attacks may be known or predefined. Various comparisons of values, abnormal or excessive values, or other detections of attack patterns, for example using one or more thresholds, statistical or probabilistic approaches may lead to determine one attack amongst a plurality of predefined attacks. Machine learning may be used.

There is further provided a method for determining a signature or monitoring a circuit payload, the circuit comprising: a plurality of sensors (101, 102, 103) distributed in the circuit, next to the predefined circuit payload (1, 2); one or more memory units (111, 112, 113) associated with the one or more sensors configured to store sensors' measures made by said one or more associated sensors, every p clock cycles. The method comprises the steps of:

reading the sensors' measures stored in the memory units; and determining a signature from the sensors' measures; and/or determining one or more attacks on the payload from the sensors' measures.

There is also provided a computer program product comprising instructions for carrying out the steps of such method when the computer program is executed on a computer device.

FIG. 1 more specifically shows a payload 1 to be protected or otherwise monitored. Other payloads, e.g. 2, can exist and can be similarly monitored (for example, by an orchestrating or decision logic not shown).

A monitoring circuit 100 can comprise a plurality of sensors (e.g. 101, 102, 103) distributed in the circuit, in, on, around or adjacent to a circuit payload, as well as one or more memory units (e.g. 111, 112, 113) being associated with the one or more sensors. The monitoring circuit 100 may be configured to output, every p clock cycles, the sensors' measures stored in the memory units (a "measure").

The collection of sensors globally reacts to stress or changes, local and/or global, in the environment (e.g. temperature, electrostatic discharges, variations in voltages, clock cycle's modifications, electromagnetic ambient conditions, laser beam, crystal striction from phonon (high frequency sound wave particle), piezo-electric effect, backside free electron injection applied to subparts of the circuit, etc). As a result, if an attack is performed, at least a subset of sensors will "react", in the meaning that their measures or values will drift or be otherwise modified. Such collective behavior can be the object of machine learning (downstream the invention). Before such a posteriori analysis, the stream of data stemming from the sensors/probes can be used to derive one signature and/or to enable computer security attacks.

Depending on the embodiments, the topology or topography of associations between memory units and sensors can vary. In general, 1 to U memory units can be associated with 1 to T sensors (i.e. 1-T, U-1, U-T). In some embodiments, a memory unit may be located in the vicinity of its associated sensor (advantages comprise the reduction of silicium surface, harder eavesdropping, and optimized energy consumption).

In an embodiment, FIFO memory units may be used, with each sensor being associated with its own FIFO memory unit. In an embodiment, one or more sensors can share one or more memory units. In some embodiments, memory units may be shared. Alternatively, one single memory unit may be used.

In one particular embodiment, to spare silicium surface (or to get a better comprise surface/energy consumption), different modules (i.e. circuits) can be placed in different ways.

One type of module can perform data reduction between a sensor and a memory unit. For example, the data reduction module (or block or unit) 121 can reduce or compact or otherwise filter the stream of bits ouput by the sensor 101. Doing so, the memory unit (or block or module) 111 can handle fewer but more significant data.

The data reduction modules and the memory units may be placed according to three main approaches. Indeed, a "sensor module" according to the invention may comprise three blocks: a "sensing block" (or "sensor"), an optional data reduction block and a memory block or unit. Depending on the placement constraint and the silicon area cost (wire cost), three placement modes can be used to place such three blocks on the floorplan.

The sensing part may advantageously be placed close to sensitive module to protect the payload. It should be noted however that the data reduction block and the memory block are not required to be close to the sensing block.

The three placement modes include:

1. A "All-in-one" embodiment: the three blocks are gathered in one single block. Although the design process appears easier according to this first placement mode, this may take much place close to the payload.

2. A "Reduced wire" embodiment: the sensing block and the data reduction block are gathered together, while the memory block can be placed with fewer constraints, for example at a certain distance.

3. A "Compact style" embodiment: only the sensing block is placed close the payload, while the data reduction block and the memory block can be placed elsewhere. As the sensing block is separate from and generally smaller than the other blocks, it may be easily placed closer or even inside the payload. The residual cost is the full signal wires to route to the data reduction block and to the memory block.

Another type of module can include a data obfuscation module 122. As used herein, "obfuscate" refers to an operation consisting in making obscure or confuse (generally intentionally) by permuting, reordering data or otherwise rearranging data. Obfuscation mechanisms can comprise one or more logic gates of Boolean type. A symmetrical de-obfuscation module 1314 can perform the reverse operation(s) and render the data clear. Such obfuscation/de-obfuscation can advantageously defeat eavesdropping of data transmitted in the circuit. As they are less sophisticated and complex than ciphering/deciphering, such operations can contribute to improve the security of the monitoring circuit 100.

Cycle Times p (integer) may be configurable between 1 to P. Attacks or perturbations can be brought within 1 clock cycle. Therefore, p can be set down to 1, at full resolution. At high values, for example p=100, the monitoring can slow down (standby, hibernation).

The variable p designates a "scan resolution", which can range from 1 to P. "p" denotes the number of clock cycles between two "measures". When p=1, the detection system works at "full resolution", i.e. some memory units will not store any data while some others will. Any available data may be used, at finest granularity. Idle monitoring state, when p>1, may be used when no sensitive operation needs to be monitored at full resolution, i.e. to follow environment evolution. Such a monitoring may be advantageous for early detection of slow environmental modifications when an attackant prepares set-up conditions for an injection attack. When p is high, typically 100 or more, the proposed arrangement consumes little energy ("low resolution" or "heartbeat" or "sleep mode" or "hibernation mode", etc.).

q may be configurable between (M+2*M/p)+1 to Q. "q" is counted in "p" clock cycles. Configuring (p times q) rules or determines how will be the monitoring time pattern. For example, if p=5, q=30, the recording and reading sequence is iterated each p*q=5*30=150 clock cycles. In case of an AES128 (M=10), p*M=50 clock cycles are used to record, 2*M=20 clock cycles are used to read memory and it remains 80 clock cycles for waiting the next iteration sequence (record and read).

p and q numbers can be chosen so as to spare energy while enabling full resolution monitoring. For example AES ciphering executes 10 clock cycles for AES 128 bits), the reaction of sensors being thus required to be fast (e.g. p=1 and q=30).

Data Pull and/or Push/Triggers

The term "receive" implies pull and/or push, which means that data can be actively collected or requested (pull) and/or data be passively emitted or received (push), depending on the embodiments. In some embodiments, data may be pushed (passively) from sensors through memory units: sensors are not controllable and nor controlled. In some other embodiments, one or more sensors can be controllable or controlled.

In an embodiment, a "measure" (collection of sensors' measures) may be triggered by a Finite State Machine (FSM), e.g. 1001. The FSM can trigger the read operations from the memory units (e.g. 111, 112, 113), thereby ruling p. Without the FSM 1001, the circuit 100 can be operatively coupled with a FSM or other mechanism to fill (write) in the memory units. With the FSM 1001, the circuit 1000 can write in memory units.

In an embodiment, a measure (collection of sensors' measures) may be triggered by software (API, Operating system, application, etc), ruling p.

In an embodiment, an event can trigger a measure. For example, it can be known that an AES ciphering operation is about to be launched. The operation can trigger a monitoring according to the invention, at full resolution and for at least 10 cycles, e.g. AES 128, this number of cycles depending on M, the recording memory depth.

In one embodiment, a second FSM 1311 can cause circuits or logics 130 and/or 140 to read written data in the memory units. The second FSM 1311 can rule the parameter q.

The monitoring circuits 100 or 1000 according to the invention can have various downstream uses. In particular, FIG. 1 shows two different uses, which can be independent or coupled, e.g. which can be performed in parallel or in series: data output can be used to determine a signature (signature generation circuit 130) and/or to detect attacks (attack detection circuit 140). In some embodiments, the signature circuit 130 and the attack detection circuit 140 are operable in parallel.

Use 1—Signature Generation 130 "PUF Like"

In an embodiment of the invention, the signature generation circuit (or block or module) can receive data pulled/requested by software or by a Signature Hardware Acceleration (SigHA) circuit 130. Such circuit can be standalone, dedicated (co-processor) or can correspond to a subpart of a general purpose computing unit, such as a Central Processing Unit 131 (or GPU). In some embodiments (as shown), the hardware of the signature generation circuit can use both parts of the CPU 131 and some other dedicated parts or extensions.

The Signature Hardware Acceleration 131 can be coupled with a FSM 1311, which in turn can control the q parameter.

In one embodiment, each sensor amongst N can provide Mi successive elementary measures of its status. FIFO memory units can be used; alternatively metadata or time-stamping data or queuing order information may be associated with measures. The signature corresponds to a set of statistical values computed from measurement sets. The signature can be a 1-D vector or a 2-D map of Gaussian statistics: mean and standard deviation (or variance).

For a single measure, each sensor provides a vector of M elementary measurements (value of its status, "FIFO depth" or buffer size). The periodicity of elementary measurements can be 1 or P clock cycle(s). The collections of N sensors thus provides N×M elementary measurements for one single measure. As the signature process uses K measures of the collection, it uses K×N×M elementary measurements.

In other words, the "depth" of a memory, for example a FIFO memory, is M. The number M corresponds to the number of measures or values that can be stored in the memory FIFO. Every P clock cycles, an elementary measure of the sensors at reach may be triggered. Once the depth of a sensor is reached, the considered sensor may stop "recording".

In other words, the recording of the sequence of M values in the FIFO can be regular every Q clock cycles (automatic monitoring) or it can be handled on demand (by trigger), for example before an event such as a sensitive computation (e.g. a ciphering operation, or the transfer of sensitive data).

For example, in standby mode, p can equal 5 and q can equal 100, with M equal to 20. The FIFO memory of depth 20 receives (or reads) every 5 clock cycles, one measure value of a sensor. It takes 5*20 (p*M)=100 clock cycles to fill up the FIFO memory. Then, 2*M=40 clock cycles to read memory. The recording/reading process starts over every p*q=500 clock cycles (q), leaving 360 cycles without any monitoring. This lowers energy consumption. The trigger to start the recording/monitoring may be generated: either automatically every q cycles of p clock cycles, either on demand (by a computation to protect).

The parameters q and p can define a time pattern, and a resolution of monitoring.

In some embodiments, all depths M of all FIFO memory units can be the same. In some embodiments, at least one depth M may be configurable. For example, respective depths can be configurable and configured given the nature of the computation to be protected. In one embodiment, the depth can correspond to the duration of the operation of interest of the payload. For example, depth M1 can equal 11 for AES 128, depth M2 can equal 15 for AES 256, depth M3 can equal 80 for SHA-1, etc. Such optimizations may advantageously gain or spare silicium surface (gate number or silicon area).

The signature building process lays on the dimensional reduction from 3-D (K×N×M) to 2-D (N×[a,b]) or 1-D (N) values of Gaussian probability distribution (mean $\mu$ and standard-deviation $\sigma$). [a,b] is a sub-set of value from the M elementary measurements.

As this ID results from statistic on dynamics behavior of the chip, it cannot be retrieved by attacker by reverse-engineering of schematic or by opening the physical chip.

In an embodiment, the Signature Hardware Acceleration (SigHA) 131 can be associated with a memory unit 1312 (e.g. to store instructions or a list 1313 of sensors to be monitored). In some embodiments, the list can be static (simplicity can lead to fast computations). In some embodiments, the list can change overtime (dynamic, conditional to tests and other parameters, following predefined scenario, enriched by machine learning, etc). Groups or subgroups of sensors can be interrogated.

The combination of the circuit 100 (collection of sensors arranged with memory units) and of a signature generation circuit provides the functionality of a PUF: uniqueness of outputs and therefore of (deterministic) signatures, unclonability due to inherent and random defects which are internal to the parts constituting the assembly of sensors, memory units and signature circuit. For a given set of sensors, there is one and only one signature. As the sensors being considered can change, a plurality of signatures can be provided.

A salient feature of the invention is that no "challenge" is required as such, as opposed to a conventional Challenge-Response system (CRP or PUF). The combination according to the invention "continuously" or "spontaneously" or "passively" emits a flow of measures, which can be used as "challenge" to compute one or more signatures (more or less stable, etc). There is accordingly no need for specific measurement with exclusive access, nor for triggering actions. DS-PUF can retrieve information for signature on-the-flow of normal usage of sensors. The "PUF" evaluation does not implicitly imply a specific measurement process: it collects (or spies) measurement data from sensors. All other PUFs need a specific measurement process with exclusive sensor access and specific environment conditioning. The secret access is also different from other PUF (except RAM-PUF, via-PUF). There is no need to proceed to multiply challenge test to extract multiple piece of secret to verify the PUF value. DS-PUF can extract the whole secret value (signature) in one single internal evaluation (K sensor-measures). There is no identifiable "challenge" (leading to fake, spoof, etc) but a stream of data with no privileged instant in time.

Incidentally, another salient feature is that the functionality of the proposed arrangement is not disabled during "challenge" and/or signature generation. In a traditional PUF system (or in a "synthetic PUF" as currently developed), the PUF hardware is mobilized to produce the response and the hardware cannot fulfill its function if any. For example, a CMOS S-PUF has to acquire an image in the dark in order to further dive into statistical properties of active pixels and determine a signature thereof. During image acquisition time, the imaging device cannot be used for other purposes. By contrast, the invention allows performing the steps of the method (e.g. measure, store, collect and generate keys) in parallel with the normal functioning of the circuit (e.g. ciphering, etc). In other words, embodiments of the invention do not lead or introduce perturbations, in the considered circuit. This means that a challenge of a regular PUF or SPUF implies that during challenge, i.e. the output of the response, the considered piece of hardware cannot play its function or role. For example a CMOS SPUF has to be placed in uniform dark conditions and cannot acquire images during CRP. In the present case, the data stream can be used to determine uniqueness of the circuit based on the circuit dynamics, while at the same time providing data that can serve as a basis to detect attacks (profiles, "signatures", etc), trigger countermeasures, etc.

From the (flow) of data, various downstream tasks can be enabled: authentication, identification, etc.

The stream of data between sensors and the arithmetic operations performed in the signature generation circuit 130 may be adversely attacked (physical probes) but few, if no knowledge, can be extracted thereof. The communication link between the sensor collection and the processing unit (for detection, initial usage; and for PUF signature building) can be dedicated or protected (physical and/or logical). Physical protection may comprise, without limitation, one or more of: own dedicated wires, molded into the circuit, made unattainable, shield(s) of wires detecting attack and deactivating lower layer, etc. Logical protection may comprise one or more of: offset or predefined tables known by manufacturer to shift or otherwise modify values or sensors, after the memory block.

In some embodiments, a Signature Hardware Acceleration circuit can speed up computations.

Use 2—Attack Detection 140

The stream of data being output by the circuit 100 or the collection of sensors and memory units, for example triggered by a FSM, can be copied (or forked or derived) to perform computer attack detection 140.

Advantageously, the proposed arrangement enables the detection of attacks by fault injection. The proposed arrangement can be referred to as a "Physical Attack Detect System" (PADS) or a "Security Intrusion of Component Detector and Ranging" (SICDAR).

Various Machine Learning techniques can be used to classify and otherwise categorize attacks (supervised or unsupervised, (rotational) Random Forests, Support Vector Machines, etc.).

In one embodiment, the attack detection operation 140 can retroact on the signature generation 130. Although the signature generation 130 may be started in parallel with the attack detection function, in some embodiments the generation of a signature may be performed in response to the receipt of a message from the attack detection operation block 140 indicating that the data can be used for signature generation (i.e. no attack has been detected.

The detection of attacks, if performed, first can inhibit, censor or otherwise regulate the signature computation.

Figure 2:
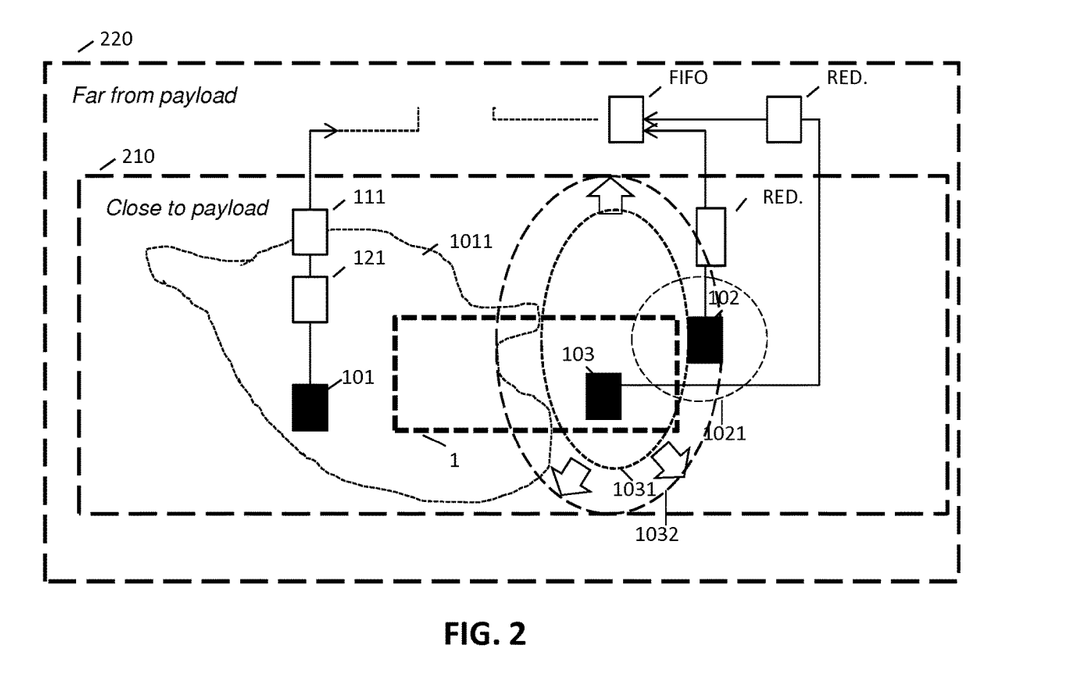
FIG. 2 illustrates exemplary distributions of sensors monitoring a payload.

FIG. 2 illustrates examples of distribution of sensors monitoring a payload.

Sensors can be distributed in various ways to watch or observe or monitor or otherwise measure the circuit payload.

In particular, FIG. 2 shows detection zones (1011, 1021, 1031) and aspects relating to the optimal pavement of space.

A digital sensor can be placed "next to" a specific part of hardware, namely a payload (e.g. "in", "near", "into", "intermingled with", "below", "on top", "beneath", "at proximity", "adjacent to"). A sensor can be "in" or "within" or "onto" or "below" or "above" a given payload: manufacturers of a given circuit payload may integrate therein one or more sensors directly at foundry. For example, sensor 103 can be natively integrated onto the payload 1.

A digital sensor can be permanently associated with a circuit or payload. A digital sensor can be movable, removable, releasable, or otherwise reconfigurable. In some embodiments, a sensor is movable (permanently or temporarily) and can in particular be "placed" (i.e. afterwards or a posteriori) on a circuit comprising the considered payload. 2D circuits can be considered along circuits in 3D (sensors can be placed within particular layers). Flexible electronics can be used.

The distribution of the sensors in the target circuit can vary: sensors can act as probes. Critical components of the circuit can be particularly protected or monitored: for example, a higher number of sensors can be mobilized. To the opposite, non critical parts of the circuit may be left unprotected. In embodiments wherein no hardware modifications are required (no sensor is added to the circuit), existing sensors can be leveraged (if accessible, directly or in directly e.g. via API or the operating system).

The topology (logical) or topography (physical) or arrangements of sensors and their detection zones can be optimized in several ways (see infra).

As various sensors can be used, the detection zones can vary. For example, associated with sensor 101, the detection zone 1011 may be guided/constrained by conductive elements (e.g. wires) and the shape of the monitored zone can be irregular (yet can be predicted by model and/or measured). Other examples of detection zones are zones 1031 and 1021, which can overlap. The coverage of the payload thus can be optimized in many ways. For example, a laser beam (illumination attack) may trigger both sensors 102 and 103 and be detected as such.

"Uncovered" spaces or "unmonitored floorplan" or "holes" can be handled in different ways. In one embodiment, an additional sensor can be placed where surveillance is not performed. In one embodiment, the one or more thresholds being handled by a digital sensor can be changed (for example from 1031 to 1032), while this may affect false positives.

Figure 3:
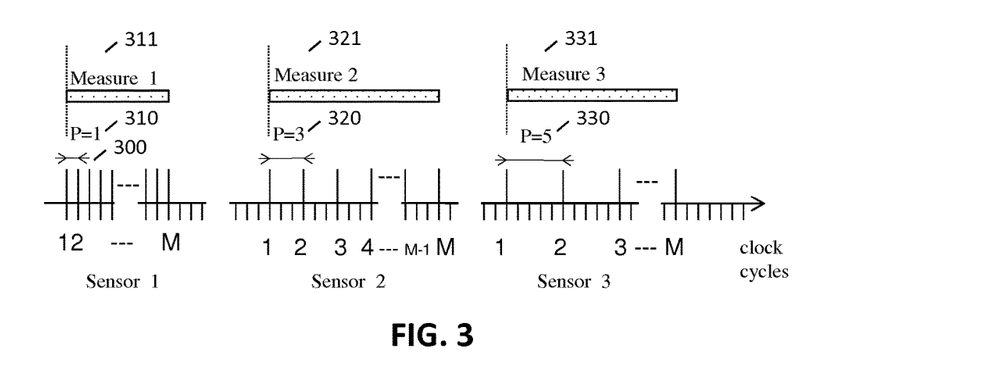
FIGS. 3 to 6 illustrate examples of p and q cycles of recordings.

FIG. 3 illustrates an example of recording for one sensor.

As used herein, the term "to record" designates the operation of writing individual sensors' measures in respective memory units.

A "measure" designates a write record in a FIFO and a read-back towards 130 and 140. It comprises M elementary records in FIFO memory units (M is the FIFO depth).

N designates the number of sensors (101, 102, 103, etc). Mi designates the depth of FIFO for sensor i. Pi the number of cycles between two successive records in a FIFO. Q designates the number of cycles between two successive measures.

In the illustrated example, M is a constant. A clock cycle is indicated by the label 300. P which can be seen as the "inter-record" delay can comprise several clock cycles (e.g. 1 in 310, 3 in 320, 5 in 330). M elementary (individual) measures are acquired (here more clock cycles can be required to get records composing the third measure, while the first measure will be determined faster for the first sensor).

In one embodiment, a ("central") FSM 1001 may handle the records (or recordings). In one embodiment, a plurality of FSM circuits, associated with each memory unit, may handle the records (FSM can be coded as hardware circuits).

The circuit 100 is then ready to be read from another FSM 1311 located downstream (for different purposes, e.g. 130 and/or 140).

Figure 4:
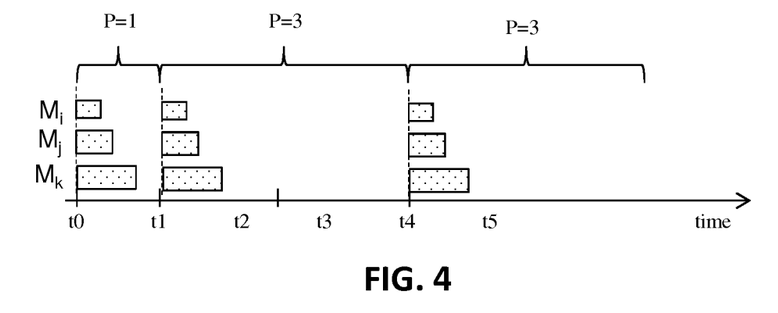

FIG. 4 illustrates an example of recording with N sensors.

The illustrated example is now for a plurality N of sensors, which can be associated with different memory units, i.e. of different depths. Mi, Mj and Mk are different memory depths in the illustrated example, with Mi<Mj<Mk. The values of Mi, Mj and Mk do not change over time. The example then shows different cycles p for writing in the memories. After one clock cycle (p=1), three measures are determined. Then after three clock cycles (P=3), three other measures are acquired. In the illustrated example, it may happen that having more (unitary) clock cycles, for p=3, memory units are filled in with some more data, which will be applied first-in first out in response to reaching the depth/buffer size. The fact that the sensors start recording simultaneously at the same time (pulse or clock cycle i) is what matters. This "captures", over comparable durations and starting simultaneously, what happens in the circuit.

Figure 5:
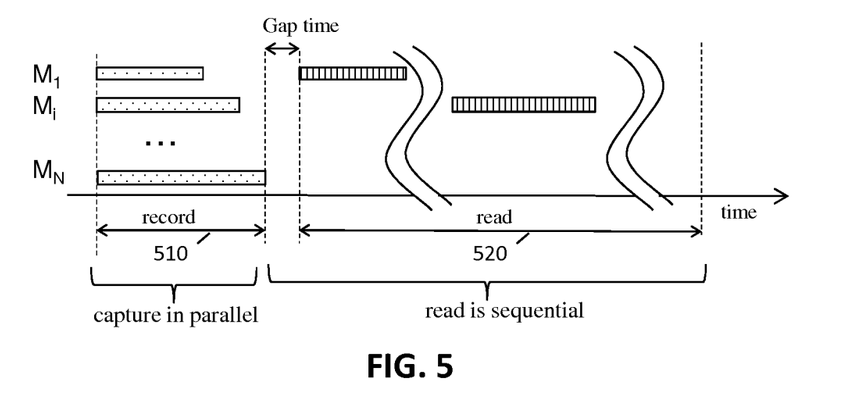

FIG. 5 illustrates an example of a measure comprising recording and reading steps with N sensors.

The illustration slightly changes the perspective, changing the perimeter from circuit 1000 to circuit 10000. At perimeter 1000, all N sensors in the circuit 100 are handled in parallel: data is written in the memory units of depths M1 to MN at the same time (recording step 510) by FSM 1001. Data is thus captured simultaneously in the circuit 100. At perimeter 1000, in response to writing, data can be called or retrieved by the FSM 1311 (reading step 520) in a sequential manner: the different buffers or memory units contents can be accessed and read one after the other for various purposes downstream. In some other embodiments, reading can yet be handled in parallel as well.

Figure 6:
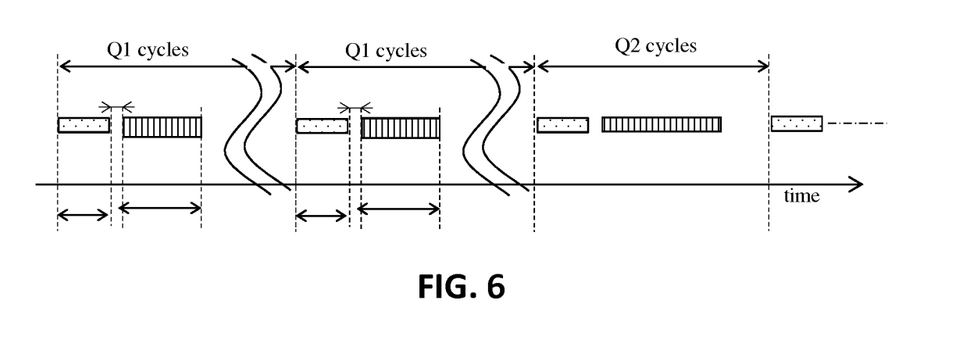

FIG. 6 illustrates an example of a plurality of successive measures comprising recording and reading steps with N sensors.

The parameter Q can rule the delay between measures (recording then reading), in number of P cycles (expressed in elementary clock cycles). Q can be controlled in hardware and/or in software.

For a given Qi cycle, the total recording time (in parallel) is the maximum of (Pi×Mi) and the total reading time (sequential) is the sum from i=1 to N of read times of Mi. Qi time is thus superior or equal to the total recording time (in parallel) plus the total reading time (sequential).

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein. The program code embodying any of the embodiments of the invention described herein is capable of being individually or collectively distributed as a program product in a variety of different forms. In particular, the program code may be distributed using computer-readable media, which may include computer-readable storage media and communication media.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A circuit for monitoring a circuit payload, comprising:
 a plurality of sensors distributed in said circuit, next to said circuit payload, said sensors being configured to provide measures related to the environment of said circuit;
 one or more memory units associated with said one or more sensors, said memory units being configured to store sensors' measures made by said one or more associated sensors, every p clock cycles;
 wherein said circuit is configured to read sensors' measures stored in at least some of said memory units,
 said circuit further comprising a Finite State Machine configured to cause the circuit to receive sensor measures during q cycles of p clock cycles,
 wherein the circuit further comprises a detection circuit configured to detect attacks from said sensors' measures.

2. The circuit of claim 1, wherein a sensor is a digital sensor or an analogical sensor coupled with a digital converter.

3. The circuit of claim 1, wherein a memory unit is of FIFO type.

4. The circuit of claim 3, wherein the depth of a memory unit is a function of a predefined computation operation performed in a monitored circuit's payload.

5. The circuit of claim 1, wherein the circuit further comprises a Finite State Machine configured to cause the circuit to receive sensor measures at every p clock cycle.

6. The circuit of claim 1, wherein p and/or q are configurable.

7. The circuit of claim 1, wherein the circuit further comprises a data obfuscation module configured to obfuscate data stemming from one or more memory units.

8. The circuit of claim 1, wherein the circuit further comprises a data reduction module configured to filter and/or reduce the amount of data stemming from one or more sensors.

9. The circuit of claim 1, wherein said one more sensors and/or said one or more memory units are reprogrammable.

10. The circuit of claim 1, wherein the circuit further comprises a signature circuit configured to determine one or more signatures from said sensor measures.

11. The circuit of claim 10, wherein the circuit has properties including physical unclonability and unique signature, while not requiring revealing said unique signature challenge and/or conditionally responding to an external challenge given predefined admissibility criteria and/or a predefined shared secret.

12. The circuit of claim 11, wherein the signature circuit and the detection circuit are operable in parallel.

13. A method for determining a signature or monitoring a circuit payload, said circuit comprising:
 a plurality of sensors distributed in said circuit, next to the predefined circuit payload, said sensors being configured to provide measures related to the environment of said circuit;
 one or more memory units associated with said one or more sensors for storing sensor measures made by said one or more sensors, every p clock cycles;
 wherein said circuit is configured to read sensors' measures stored in at least some of said memory units;
 said circuit further comprising a Finite State Machine configured to cause the circuit to receive sensor measures during q cycles of p clock cycles;
 wherein the method comprises the steps of:
 reading sensors' measures stored in at least some of said memory units; and
 determining a signature from said sensors measures; and/or
 determining one or more attacks on the payload from said sensors measures.

* * * * *

UNITED STATES PATENT AND TRADEMARK OFFICE
CERTIFICATE OF CORRECTION

| | | |
|---|---|---|
| PATENT NO. | : 11,481,522 B2 | Page 1 of 1 |
| APPLICATION NO. | : 17/276465 | |
| DATED | : October 25, 2022 | |
| INVENTOR(S) | : Adrien Facon et al. | |

It is certified that error appears in the above-identified patent and that said Letters Patent is hereby corrected as shown below:

On the Title Page

In (30) Foreign Application Priority Data should be corrected as follows:
18306204

Signed and Sealed this
Fifteenth Day of October, 2024

Katherine Kelly Vidal
*Director of the United States Patent and Trademark Office*